US006856406B2

(12) United States Patent
Chase

(10) Patent No.: US 6,856,406 B2
(45) Date of Patent: Feb. 15, 2005

(54) ULTRA SMALL SPOT GENERATOR

(75) Inventor: Roland H. Chase, Lanham, MD (US)

(73) Assignee: Richard L. Scully, Banner Elk, NC (US)

(*) Notice: Subject to any disclaimer, the term of this patent is extended or adjusted under 35 U.S.C. 154(b) by 0 days.

(21) Appl. No.: 10/252,795

(22) Filed: Dec. 18, 2002

(65) Prior Publication Data

US 2003/0090679 A1 May 15, 2003

Related U.S. Application Data

(63) Continuation of application No. 09/615,714, filed on Jul. 13, 2000, now abandoned, which is a continuation-in-part of application No. 09/035,824, filed on Mar. 6, 1998, now Pat. No. 6,269,066.

(51) Int. Cl.$^7$ ............................................. G01B 9/02
(52) U.S. Cl. ......................................................... 356/519
(58) Field of Search .............................. 356/480, 519, 356/450

(56) References Cited

U.S. PATENT DOCUMENTS

| | | | |
|---|---|---|---|
| 3,506,334 A | | 4/1970 | Korpel |
| 3,597,701 A | | 8/1971 | Cornillault |
| 3,603,685 A | | 9/1971 | Heflinger |
| 3,758,194 A | * | 9/1973 | Daval et al. ................ 359/260 |
| 4,789,978 A | | 12/1988 | Shikama et al. |
| 5,071,253 A | | 12/1991 | Chase |
| 5,119,454 A | | 6/1992 | McMahon |
| 5,587,983 A | | 12/1996 | Bailey |
| 5,646,920 A | | 7/1997 | Raczynski |
| 6,366,547 B1 | * | 4/2002 | Chase ................... 369/112.01 |

OTHER PUBLICATIONS

Principles of Optics, Born et al, 1980, pp 323–333, 341–347, 360–367.*

S. Tolansky, Jun. 18, 1943, Philosophical Magazine, vol. 34, p. 555.*

* cited by examiner

*Primary Examiner*—Samuel A. Turner

(57) ABSTRACT

An interferometer is used to provide control to the intensity profile and position of a spot of light. In this invention, each light ray from a spectral source is regenerated into a plurality of light rays by an interferometer. These rays are focused by a lens into a constructive interference fringe on a focal plane. A voltage across the interferometer can change the index of reflection of the interferometer thus defines the position of the constructive interference fringe on the disk.

19 Claims, 17 Drawing Sheets

9nm-spot (9nm-spot.MCD)
Wavelength of the laser                              $\lambda := 0.635$ microns
Focal length of the lens                             $f := 1000.000$ microns
Interferometer coefficient of reflection             $R := 0.99$                  $F := \dfrac{4 \cdot R}{(1 - R)^2}$    $F = 3.96 \cdot 10^4$ Index of refraction of the Fabry-Perot (KD*P)        $n := 1.502$ C   = speed of light (microns/second)                                              $C := 3 \cdot 10^{14}$
$\rho$   = electro-optic coefficient (microns/volts)                               $\rho := 3.22 \cdot 10^{-5}$
$\varepsilon$   = dielectric constant:                                             $\varepsilon := 44.5$
kZ  = Zeeman constant                                $kZ := 7.142857 \cdot 10^7 \cdot C$    $kZ = 2.143 \cdot 10^8$ The first constructive interface fringe ring [order of interference (M-1)]
Radius in the focal plane                            $\Gamma 1 := 10.0$ microns
Angle with respect to the optical axis               $\Theta 1 := \operatorname{atan}\left(\dfrac{\Gamma 1}{f}\right)$       $\Theta 1 = 0.01$ Transmission angle through the Fabry-Perot           $\Phi 1 := \operatorname{asin}\left(\dfrac{\sin(\Theta 1)}{n}\right)$   $\Phi 1 = 0.006658$

FIG.8A-1

Interferometer configuration parameters

Order of interference $$M := \text{floor}\left(\frac{1}{1 - \cos(\Phi 1)}\right) \qquad M = 45124$$

Thickness of the Fabry-Perot Interferometer $$T := \frac{M \cdot \lambda}{2 \cdot n} \qquad T = 9.539 \cdot 10^3 \text{ microns}$$

The second constructive interference fringe ring [order of interference (M - 2)]

Transmission angle through the Fabry-Perot
$$\Phi 2 := \text{acos}\left(\frac{M - 2}{M}\right) \qquad \Phi 2 = 0.009 \text{ radians}$$

Angle with respect to the optical axis
$$\Theta 2 := \text{asin}(n \cdot \sin(\Phi 2)) \qquad \Theta 2 = 0.014 \text{ radians}$$

Radius in the focal plane
$$\Gamma 2 := f \cdot \tan(\Theta 2) \qquad \Gamma 2 = 14.143 \text{ microns}$$

The third constructive interference fringe ring [order of interference (M - 3)]

Transmission angle through the Fabry-Perot
$$\Phi 3 := \text{acos}\left(\frac{M - 3}{M}\right) \qquad \Phi 3 = 0.012 \text{ radians}$$

Angle with respect to the optical axis
$$\Theta 3 := \text{asin}(n \cdot \sin(\Phi 3)) \qquad \Theta 3 = 0.017 \text{ radians}$$

Radius in the focal plane
$$\Gamma 3 := f \cdot \tan(\Theta 3) \qquad \Gamma 3 = 17.322 \text{ microns}$$

The fourth constructive interference fringe ring [order of interference (M - 4)]

Transmission angle through the Fabry-Perot
$$\Phi 4 := \text{acos}\left(\frac{M - 4}{M}\right) \qquad \Phi 4 = 0.013 \text{ radians}$$

Angle with respect to the optical axis
$$\Theta 4 := \text{asin}(n \cdot \sin(\Phi 4)) \qquad \Theta 4 = 0.02 \text{ radians}$$

Radius in the focal plane
$$\Gamma 4 := f \cdot \tan(\Theta 4) \qquad \Gamma 4 = 20.003 \text{ microns}$$

FIG.8A-2

Angles greater than $\delta\phi$ can be filtered out of the energizing pencil using a Fabry-Perot Interferometer $\delta\phi = \Phi 4 - \Phi 3$      $\delta\phi = 0.001784$ radians Thus the order number of Fabry-Perot Interferometer must be:

$$\mu := \text{floor}\left(\frac{1}{2 \cdot (1 - \cos(\delta\phi))}\right) \quad \mu = 314236$$

This requires the length of the Fabry-Perot Interferometer to be:

$$\text{length} = \frac{\mu \cdot \lambda}{2 \cdot n} \quad\quad \text{length} = 6.642 \cdot 10^4 \text{ microns}$$

This suggest that the angular radius of the Airy Disk (Fraunhofer circular aperture Diffraction) of the Lens should be $\delta\phi$:

This in turn suggest the diameter of the Lens should be:

$$\text{dia} = \frac{1.22 \cdot \lambda}{\delta\phi} \quad\quad \text{dia} = 434.272 \text{ microns}$$

which would require the F/# of the Lens to be:

$$FN = \frac{f}{\text{dia}} \quad\quad FN = 2.303$$

and the Numerical Aperture to be:

$$NA = \frac{1}{2 \cdot FN} \quad\quad NA = 0.217$$

FIG.8B

Interference intensity distribution curves (at the focal plane)
Intensity at the focal point $i = 0, 1 \ldots 2000$  $r_i := \dfrac{i}{500} - 2.0$  $\Delta r = \dfrac{r_{2000} \cdot r_0}{2000}$  $\Delta r = 0.002$ $Rf_i := \dfrac{r_i \cdot dia}{\lambda \cdot f}$  $Ifea_i = \left(\dfrac{2 \cdot J1(\pi \cdot Bf_i)}{\pi \cdot Bf_i}\right)^2$ $\theta_i := \operatorname{atan}\left(\dfrac{r_i}{f}\right)$  $\phi_i := \operatorname{asin}\left(\dfrac{\sin(\theta_i)}{n}\right)$  $\delta_i := \dfrac{4 \cdot \pi \cdot n \cdot T \cdot \cos(\phi_i)}{\lambda}$  $Ipfp_i := \dfrac{1}{1 + F \cdot \sin\left(\dfrac{\delta_i}{2}\right)^2}$ $I_i := Ifca_i \cdot Ipfp_i$ $Ifca3db_i := \operatorname{if}(Ifca_i < 0.5, 0, 1)$ $Ipfp3db_i := \operatorname{if}(Ipfp_i < 0.5, 0, 1)$ $I3db_i := \operatorname{if}(I_i < 0.5, 0, 1)$

FIG. 8C-1

$wfca = \sum_i Ifca3db_i$    $wfca = 752$ $BWfca = \Delta r \cdot wfca$    $BWfca = 1.504$ microns $wpfp = \sum_i Ipfp3db_i$    $wpfp = 399$ $BWpfp = \Delta r \cdot wpfp$    $BWpfp = 0.798$ microns $wI3db = \sum_i I3db_i$    $wI3db = 366$ $BWI3db = \Delta r \cdot wI3db$    $BWI3db = 0.732$ microns Constructive interference of the 3$^{rd}$ Fringe of the Fabry-Perot Interferometer (Operating Fringe)

Fringe off set distance    $osd := \Gamma 3$ $\theta 3_i := \operatorname{atan}\left(\dfrac{r_i + osd}{f}\right)$    $\phi 3_i := \operatorname{asin}\left(\dfrac{\sin(\theta 3_i)}{n}\right)$    $\delta 3_i := \dfrac{4 \cdot \pi \cdot n \cdot T \cdot \cos(\phi 3_i)}{\lambda}$    $I3fp_i := \dfrac{1}{1 + F \cdot \sin\left(\dfrac{\delta 3_i}{2}\right)^2}$ $I3_i = Ifca_i \cdot I3fp_i$ $I3fp3db_i = \operatorname{if}(I3fp_i < 0.5, 0, 1)$

FIG.8D-2

$$w3fp = \sum_i I3fp3db_i$$

$$Bw3fp = \Delta r \cdot w3fp$$

$$wI3fp3db = \sum_i I3fp3db_i$$

$$BwI3fp3db = \Delta r \cdot wI3fp3db$$

$$w3fp = 5$$

$$Bw3fp = 0.01 \text{ microns}$$

$$wI3fp3db = 5$$

$$BwI3fp3db = 0.01 \text{ microns}$$

FIG. 8E-2

ULTRA SMALL SPOT GENERATOR

This is a continuation of patent application Ser. No. 09/615,714, filed on Jul. 13, 2000 now abandoned which was a continuation in part application of U.S. patent application Ser. No. 09/035/824, filed on Mar. 6, 1998 by Roland H. Chase which issued as U.S. Pat. No. 6,269,066 on Jul. 31, 2001.

BACKGROUND OF THE INVENTION

The technological growth of the computer industry has been progressing at an extremely fast pace. Products that are barely three years old are considered obsolete. The demand for more powerful computers translates into demands of faster data processing speed and greater data storage capacity. The present invention fits in the category of meeting the demand for greater data storage capacity. Presently, data stored on an optical data storage device are retrieved by observing the behavior of light being reflected from the optical data storage device. As storage capacity increases, the amount of data per unit of area increases. A practical limitation of the storage capacity of an optical data storage device is the size of a spot of light that can be generated by a reader head. The present invention discloses a spot of light that is many orders of magnitudes smaller than those currently being used in the market place.

SUMMARY OF THE INVENTION

The present invention discloses a novel method and apparatus to produce an extremely small spot of light.

BRIEF DESCRIPTION OF THE DRAWING

FIGS. 8A, 8B, 8C, 8D and 8E illustrate a design sample showing detailed calculations and design parameters for one wavelength.

DETAILED DESCRIPTION OF THE INVENTION

Figure 1:
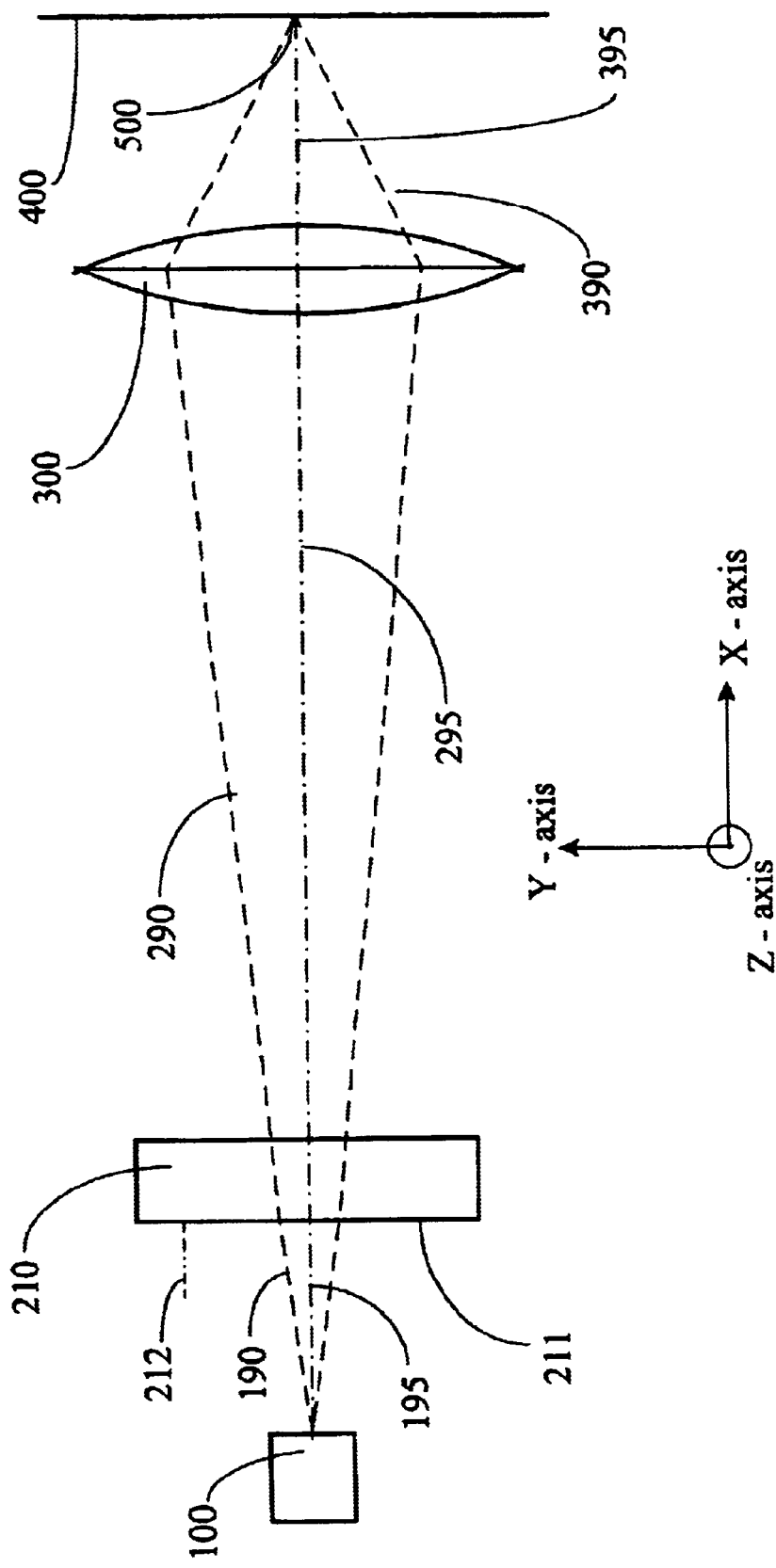
FIG. 1 illustrates a first embodiment of an optical configuration using a Fabry-Perot interferometer and a spectral light source.

FIG. 1 shows an optical system employing a conventional Fabry-Perot interferometer. The Fabry-Perot interferometer is an angle filter and is the basis of this invention.

In FIG. 1, the X-axis is parallel to an optical axis, 395, of the objective lens, 300. The Y-axis lies in a plane of the drawing and is perpendicular to axis 395. The Z-axis is perpendicular to the plane of the drawing.

A spectral light source, 100, emits a pencil of light rays, 190. The central ray, 195, of pencil, 190, is incident on a Fabry-Perot interferometer, 210, normal, 212, to entrance face, 211. Central ray, 195, is parallel to an optical axis, 395, of the Objective lens, 300.

It is a long established principle of multiple-beam interference phenomenon, well known to those skilled in the art of physical optics, that of the infinite number of rays incident on a Fabry-Perot interferometer only those having unique angles, with respect to the normal, 212, to the entrance face, 211, can successfully be transited through the interferometer. All other rays suffer destructive interference and are filtered out of the pencil.

Figure 2:
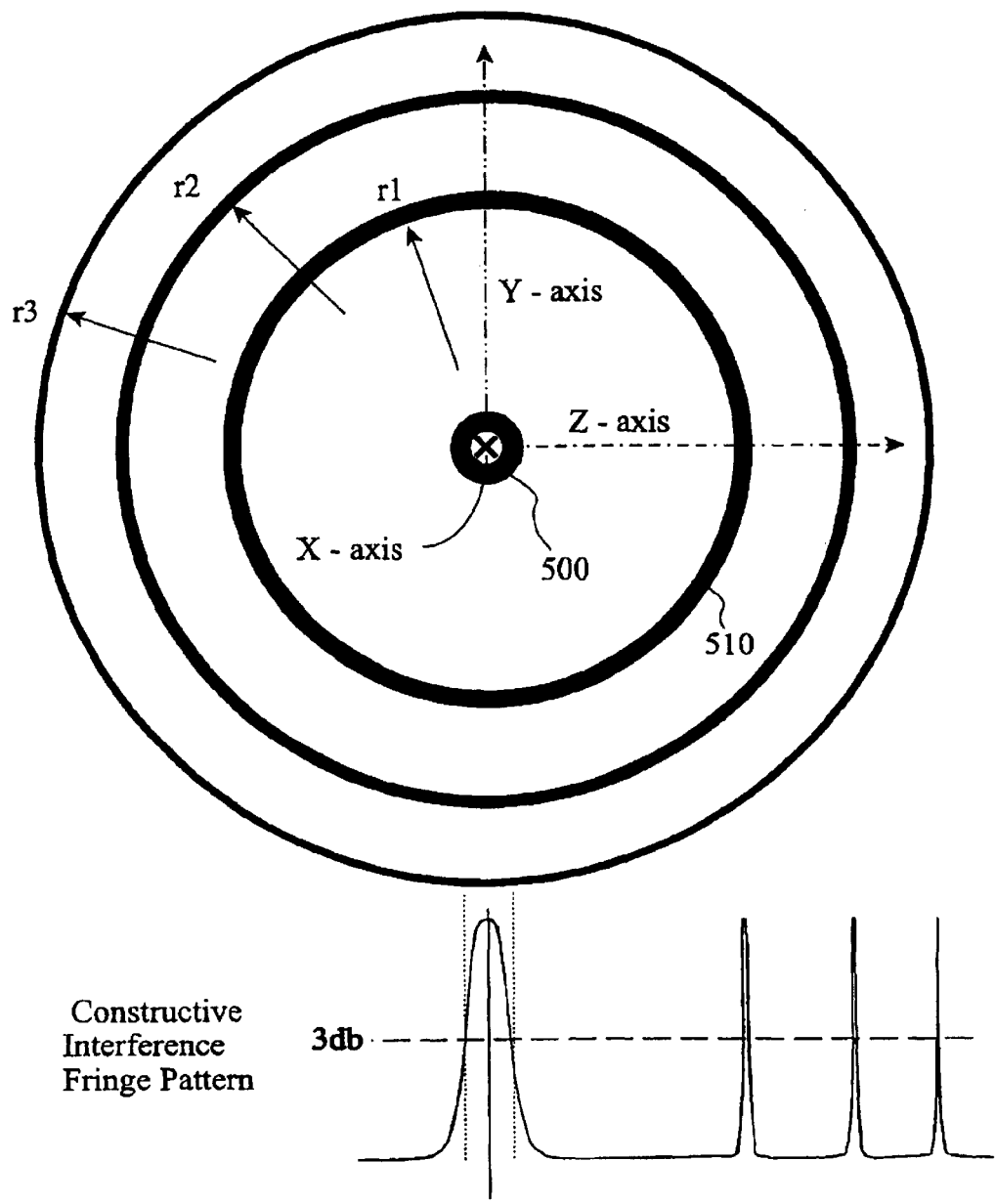
FIG. 2 illustrates the annular ring constructive interference fringes produced by the first embodiment as shown in FIG. 1.

Those rays successfully transiting through interferometer 210 are collected by Objective lens, 300, and converged into annular constructive interference fringe rings on a focal plane, 400. These annular constructive interference fringe rings are shown in FIG. 2. Here the central fringe 500 is shown at the focal point of lens 300 with the first annular ring fringe, 510, at a radius r1. Here r1 is defined as:

$$r1 = \arctan(01/f)$$

Where 01 is an angle, with respect to normal 212, inside pencil 190 and f is the focal length of lens, 300. Likewise r2 and r3 are defined as:

$$r2 = \arctan(02/f)$$

And $$r3 = \arctan(03/f)$$

It should be noted that the closer is the fringe to the focal point of lens 300, the wider is the fringe. Conversely, the farther is a fringe from the focal point, the narrower is the fringe. Since FIG. 2 is drawn on white paper, the colors are reversed. The black rings actually represent high intensity constructive interference fringe rings and the white spacing between represents regions void of light, also known as regions of destructive interference where the light has been filtered out of pencil 190.

Figure 3:
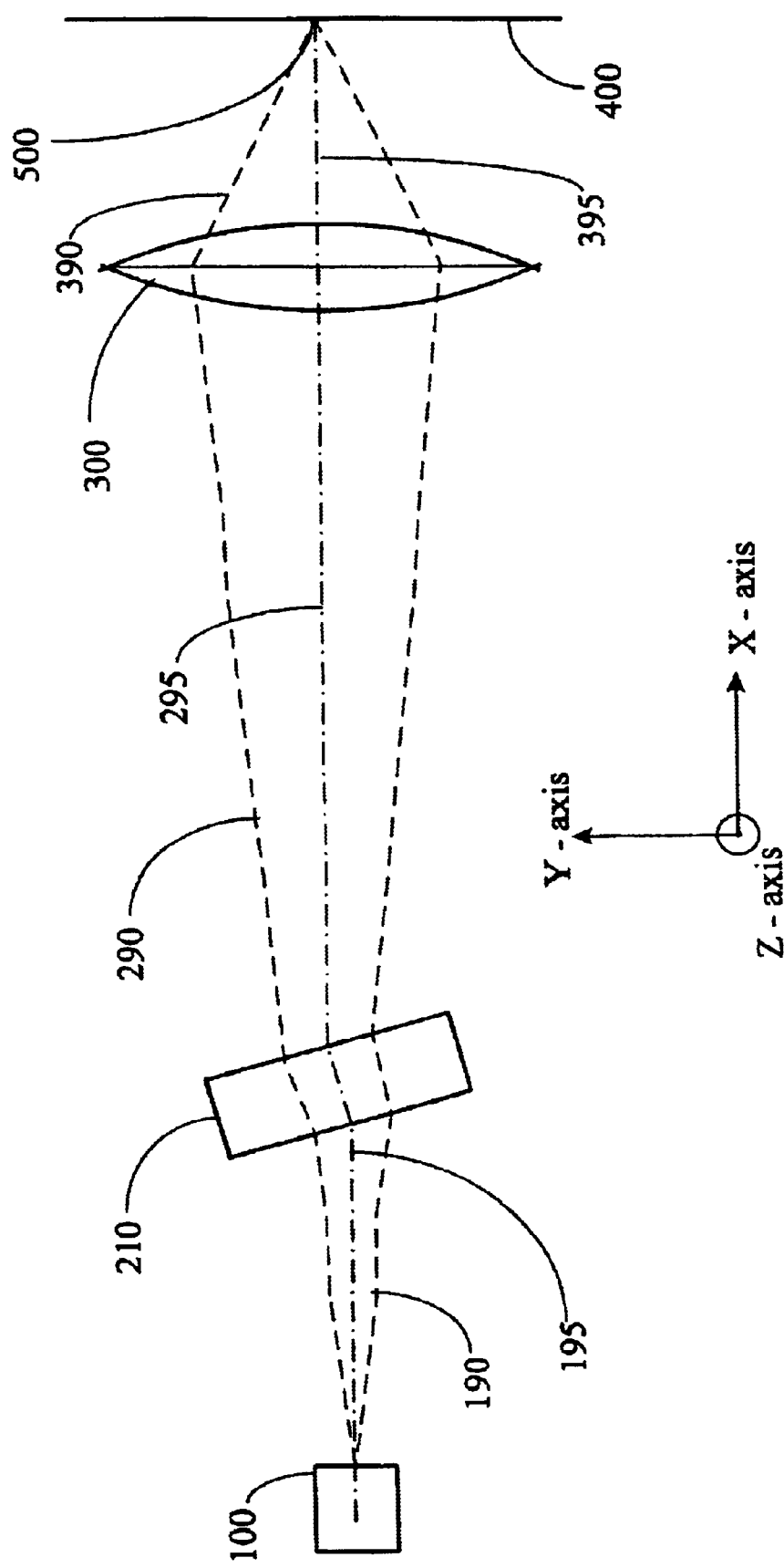
FIG. 3 illustrates a second embodiment of the present invention.
Figure 4:
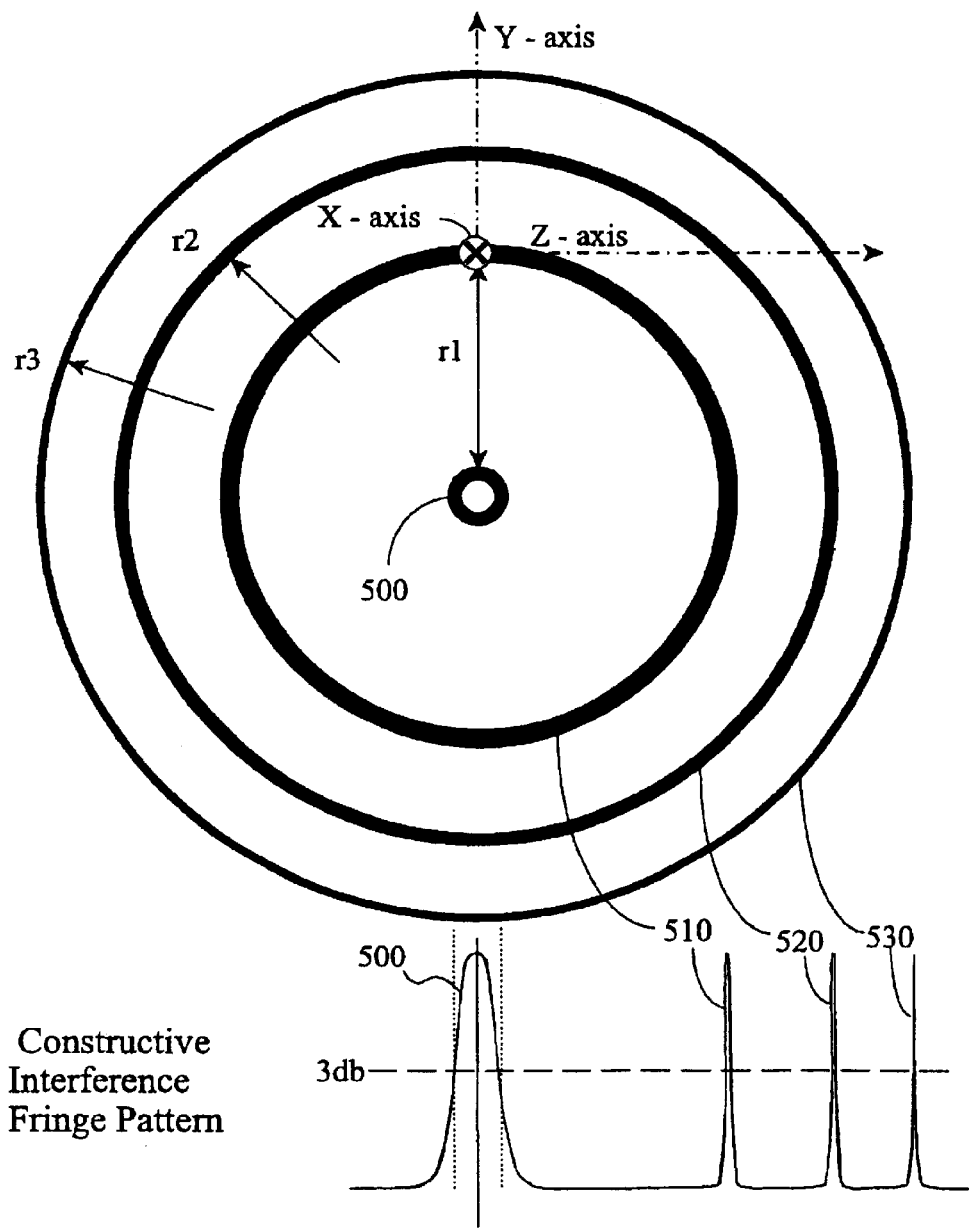
FIG. 4 illustrates the annular ring constructive interference fringes produced by the second embodiment of the present invention as shown in FIG. 3.

The second embodiment of the present invention is shown in FIG. 3. This is a modification of FIG. 1 wherein interferometer 210 has been rotated an angle 01 about the Z-axis. This causes fringe 510 to be displaced, in focal plane 400, along the Y-axis by a distance r1, as shown in FIG. 4.

Figure 5:
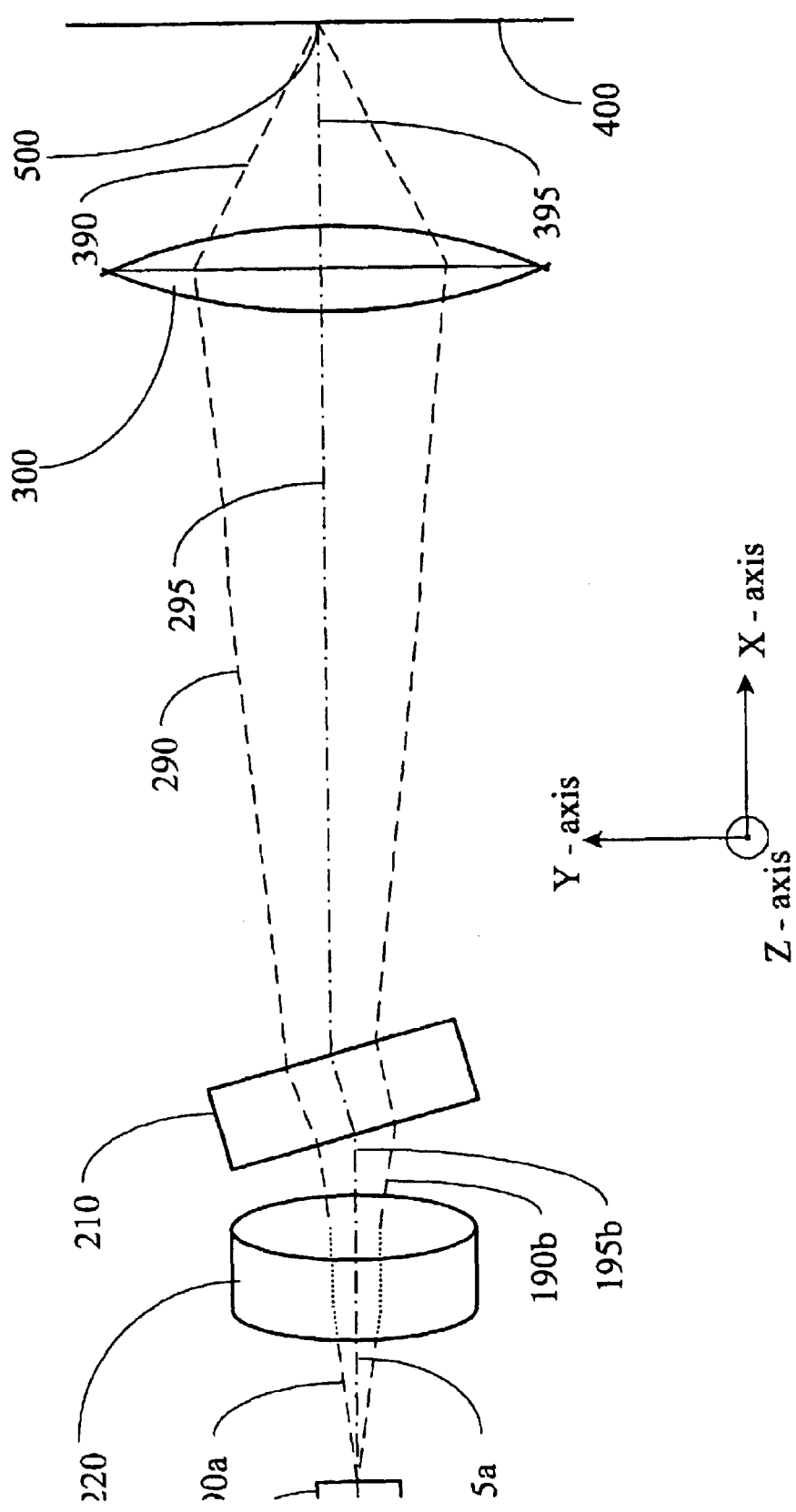
FIG. 5 illustrates a third embodiment of the present invention using two Fabry-Perot interferometers.

The third embodiment of the present invention is shown in FIG. 5. This is a modification of FIG. 3 wherein a second Fabry-Perot interferometer, 220, has been added. For the sake of clarity, the fringe that would be transmitted by interferometer is labeled as 500a while those that would be transmitted by interferometer 220 are labeled as 510b.

Figure 6:
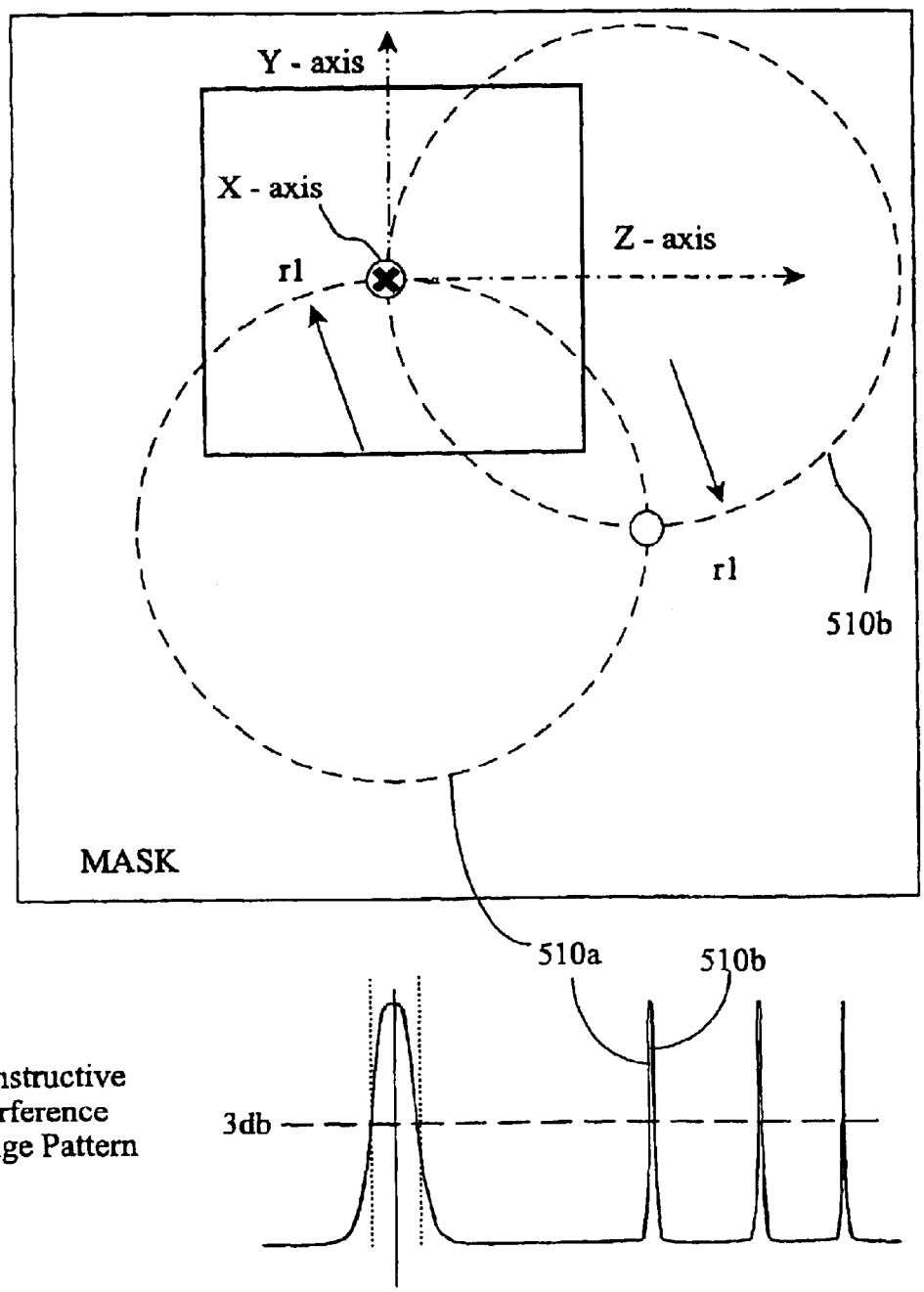
FIG. 6 illustrates two annular ring constructive interference fringes produced by the third embodiment of the present invention as shown in FIG. 5.

Here interferometer 210 has been rotated an angle 01 about the Y-axis and interferometer 220 has been rotated by an angle 01 about the Z-axis. This causes fringe 510a to be displaced, in the focal plane of lens 300, along the Y-axis a distance r1 and fringe 510b to be displaced, in the focal plane of lens 300, along the Z-axis a distance r1, as shown in FIG. 6.

Because interferometer 210 can only transmit rays making an angle 01 with respect to the normal to its entrance face and interferometer 220 can only transmit rays making an angle 01 with respect to the normal to its entrance face, there are only spots in the focal plane where this condition can be satisfied. The preferred spot is located at the focal point of lens 300. The other spot lies on a diagonal bisecting the Y-axis and Z-axis. The other spot is masked out.

The Fabry-Perot interferometer is one member of a family of instruments that employ the principle of multiple-beam interference. Other members of this family are the Lummer-Gehreke interferometer, the interference filter, and the frustrated total reflection interference filter. All of these instruments regenerate every single ray, from a pencil of rays, into a multitude of parallel, geometrically degraded amplitude, phase related rays. When each set of parallel rays are brought to separate points in the focal plane of a lens, they will interfere with each other. The intensity of the light at each point is dependent upon optical path difference between sequential parallel rays has traveled. If the path difference between sequential sets of rays is an integer number of wavelengths, then the intensity is at a maximum. If it is a half integer, the intensity is zero. Any other value of the path difference will yield an intermediate intensity.

Thus, in addition to the Fabry-Perot interferometer, this invention will function with either a Lummer-Gehreke interferometer, an interference filter, or a frustrated total reflection interference filter.

Figure 7:
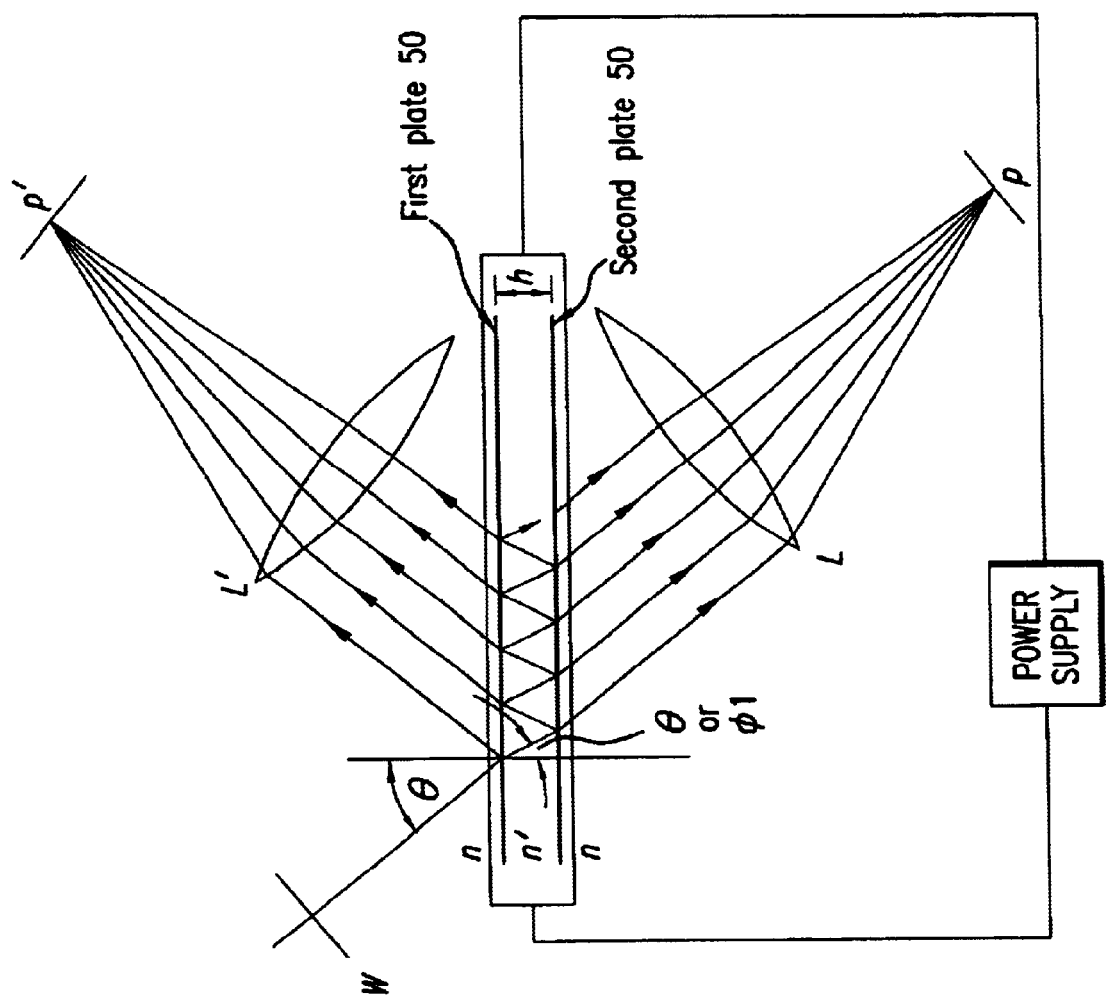
FIG. 7 illustrates a Fabry-Perot interferometer configured as an electro-optical device containing a media inside the interferometer that exhibits Kerr or Pockel effect.
Figures 2, 8C:
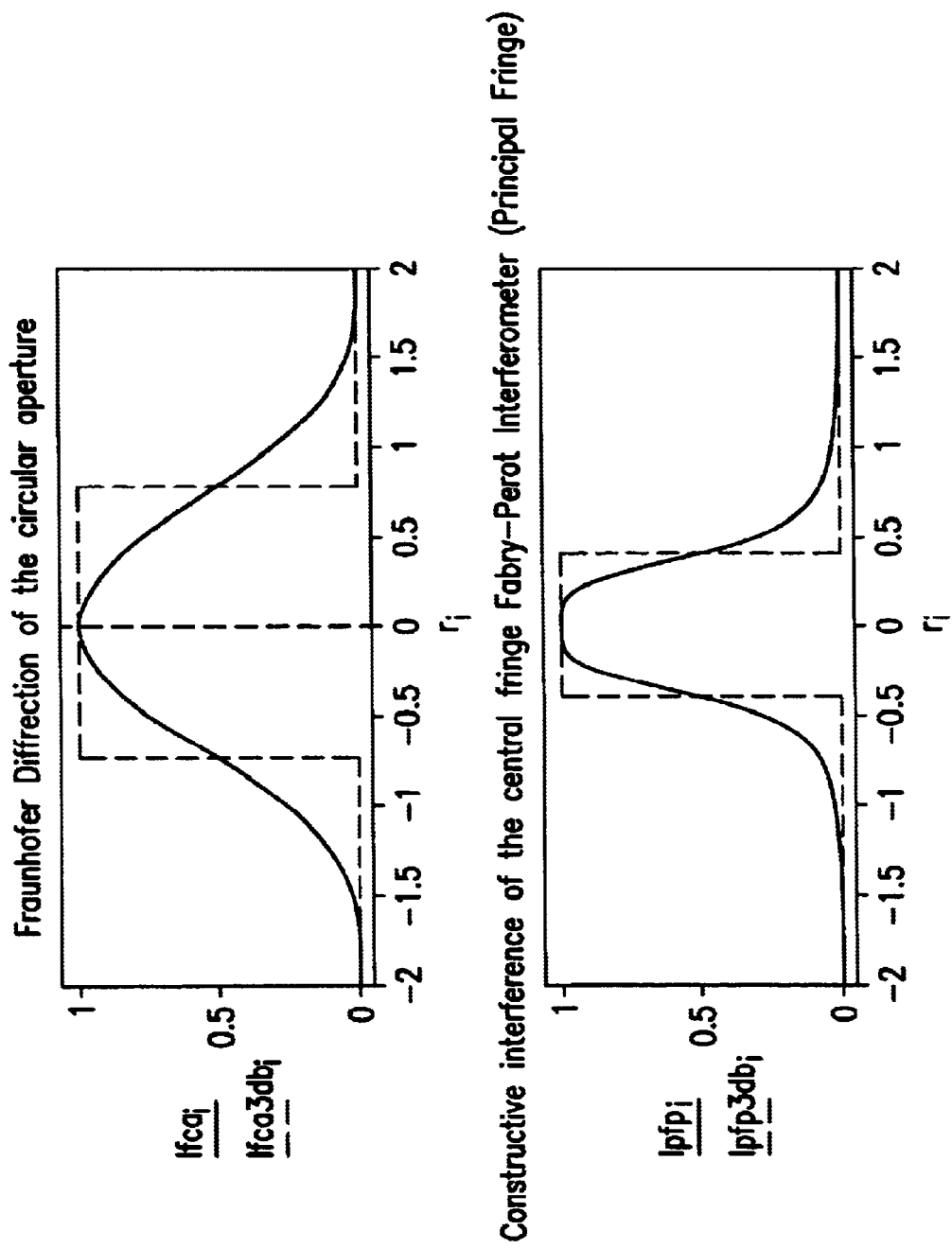
Figures 1, 8D:
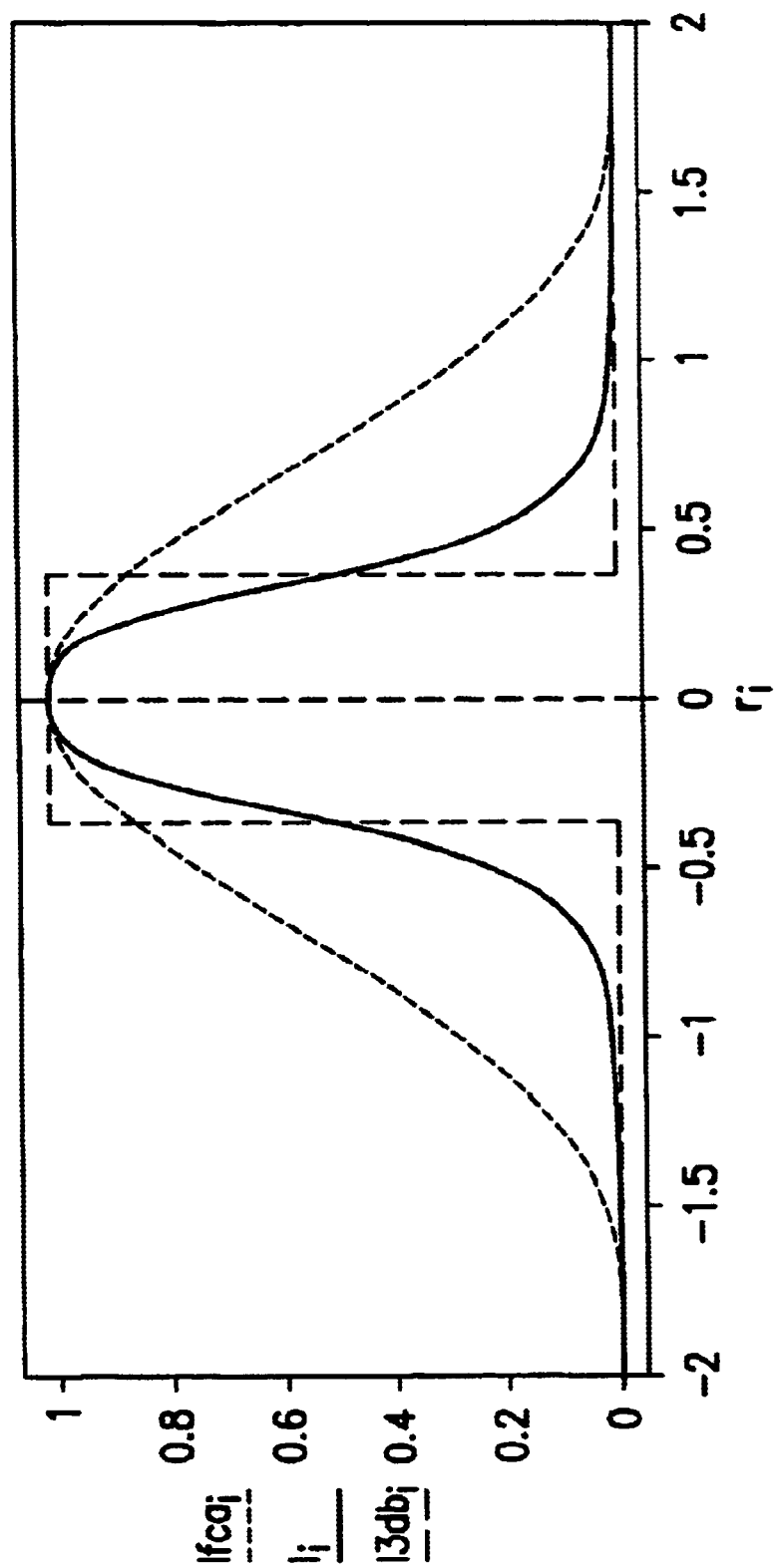
Figures 1, 8E:
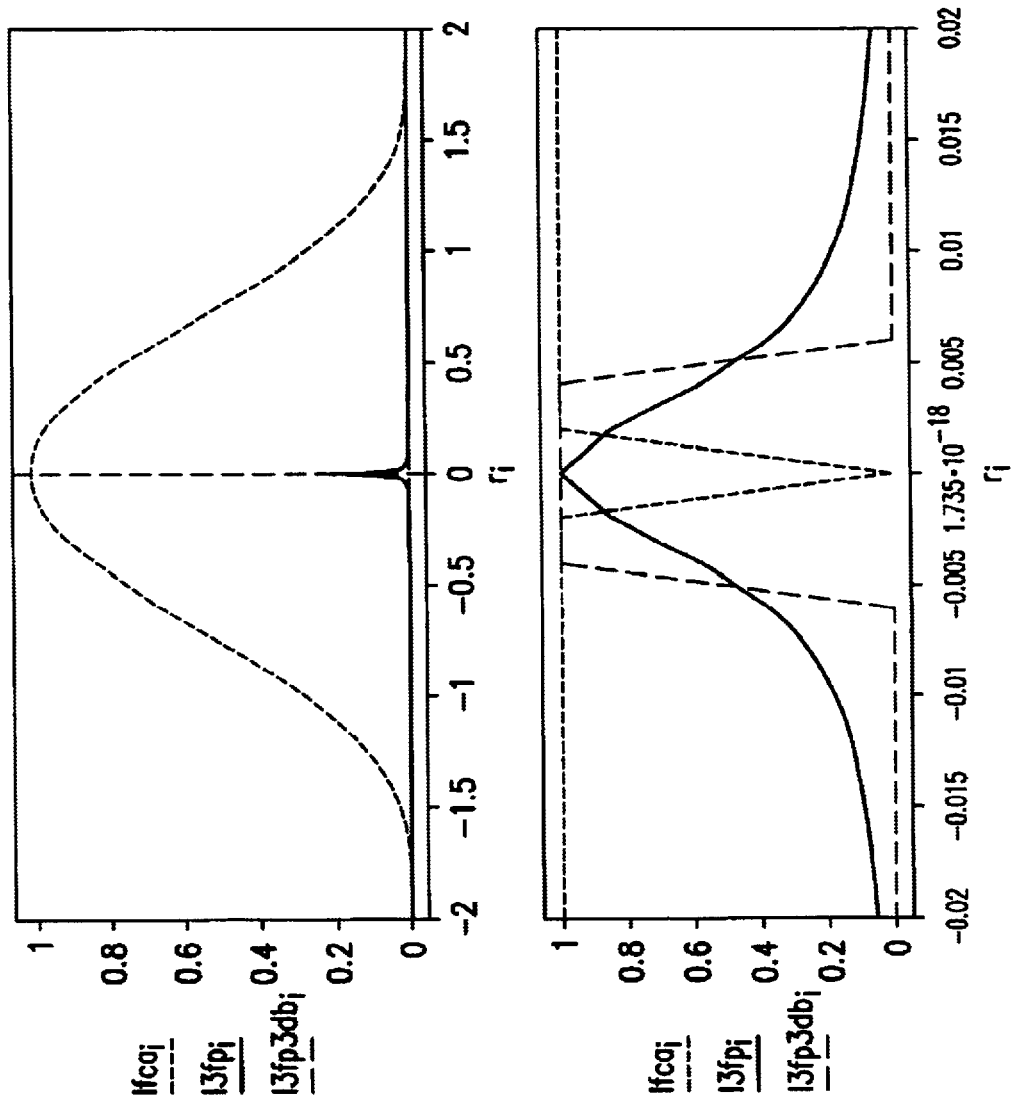
Figure 9:
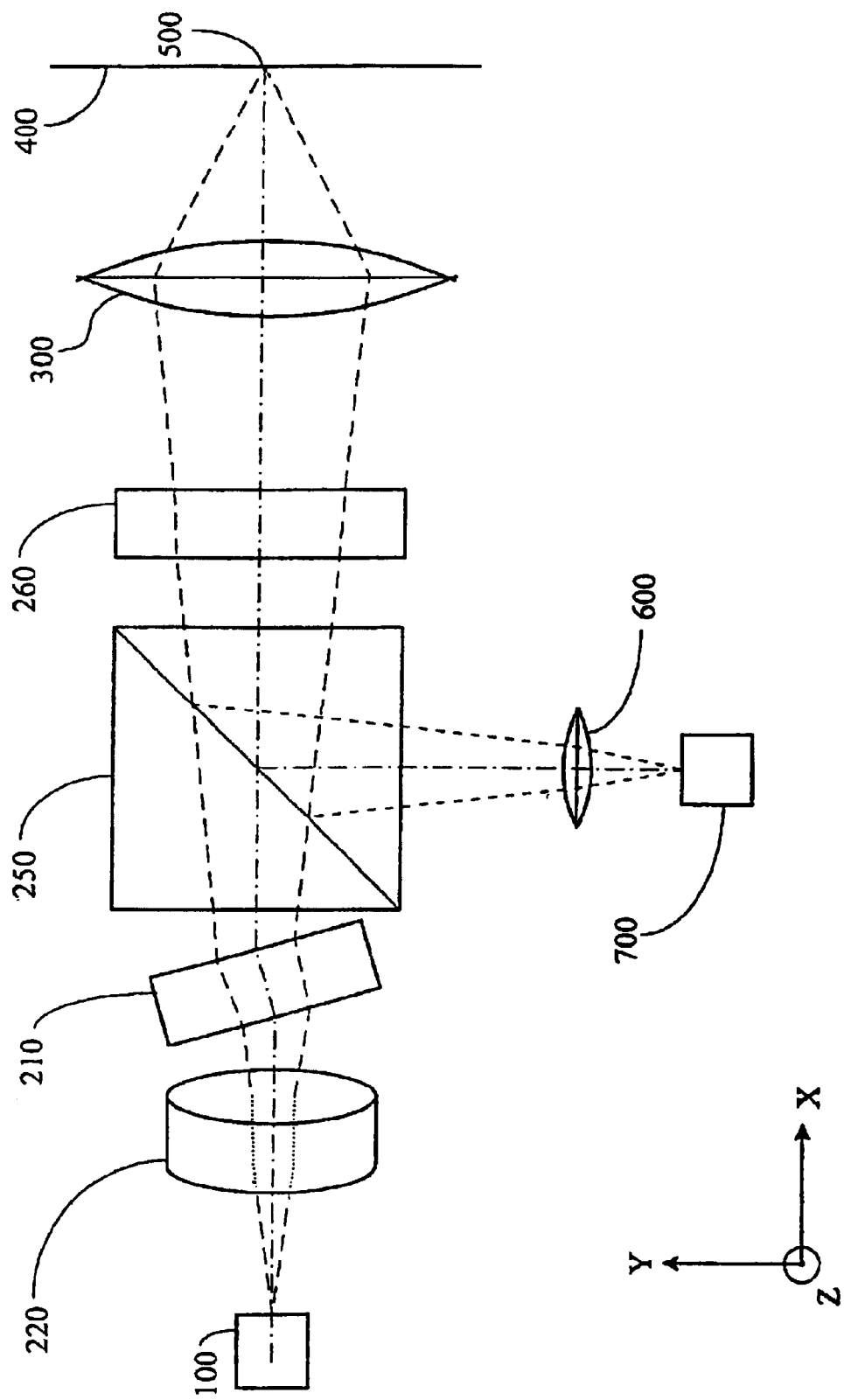
FIG. 9 illustrates an optical head wherein a spot in the focal plane of a lens is illuminated and characteristics of reflected light rays are detected. Here, source 100 emits a diverging pencil 190, polarized in the plane of the drawing, which is transmitted through Fabry-Perot interferometer 210, rotated at an angle by θ1 about the z-axis, Fabry-Perot interferometer 220, rotated by an angle θ1 about the Y-axis, polarizing beam splitter 250, quarter-wave plate 260, and lens 300 to produce spot 500 on focal plane 400. The quarter-wave plate rotates the polarization, about the optical axis by 45 degrees.

FIG. 7 illustrates by way of an example a Fabry-Perot interferometer also functioning as an electro-optical device employs the Kerr or Pockel effect. It should be noted that the electro-optical device can also be a Lummer-Gehreke interferometer, interference filter, or frustrated total reflection interference filter. The medium inside the Fabry-Perot interferometer, Lummer-Gehreke interferometer, interference filter, or frustrated total reflection interference filter can be an electro-optical material so that a voltage applied across therein will change the index of the medium thus causing the angles that can propagate through the instrument to change. The medium can be various types of gases, liquids or solids, such as KD*P.

If the medium between the reflecting surfaces is an electro-optical material then the optical path changes as the result of an electric, or magnetic field applied across the device. This in turn causes the angle at which constructive interference occurs to change thus producing a change in the position of the spot, or constructive interference fringe.

A magnetic, or electric field applied to the spectral source will cause the wavelength of the source to change. This also causes the position of the spot to change.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. An optical apparatus for generating an ultra small spot of light on a focal plane, comprising:
   a light source emitting, a pencil of light rays to an optical path along an optical axis;
   a first interferometer;
   a second interferometer;
   a beam splitter;
   a quarter wave plate; and
   an objective lens;
   wherein the pencil of light rays is transmitted respectively through the interferometers, the beam splitter, the quarter-wave plate, and the objective lens to become constructive interference fringes of light upon reaching the focal plane.

2. The optical apparatus of claim 1, wherein the first and second interferometers are in optical alignment to the optical axis.

3. The optical apparatus of claim 1, wherein the first interferometer has a first interferometer optical axis intersecting the optical axis.

4. The optical apparatus of claim 3, wherein the second interferometer has a second interferometer optical axis intersecting the optical axis.

5. The optical apparatus of claim 4, wherein the target is in a focal plane of the objective lens.

6. The optical apparatus of claim 1, wherein a plane defined by the first interferometer optical axis and the optical axis perpendicularly intersects a plane defined by the second interferometer optical axis and the optical axis.

7. The optical apparatus of claim 1, wherein the pencil of light rays is filtered by the first interferometer to produce a definable number of constructive interference fringe rings all sharing a center point and each ring has a unique radius as measured from the center point.

8. The optical apparatus of claim 7, wherein the pencil of light rays that are filtered by the first interferometer and the second interferometer become a sector as manifested on a focal plane of the objective lens.

9. The optical apparatus of claim 1, wherein one of or both of the first and second interferometers are Fabry-Perot interferometers.

10. The optical apparatus of claim 1, wherein one of or both of the first and second interferometers are interference filters.

11. The optical apparatus for generating an ultra small spot of light, comprising:
    a light source surrounded by a coil generating either an electric field or a magnetic field and emitting a pencil of light rays to an optical path along an optical axis;
    a first interferometer;
    a second interferometer; and
    an objective lens;
    wherein the pencil of light rays is transmitted respectively through the first and second interferometers and objective lens to become constructive interference fringes of light upon reaching said field-controlled location on a focal plane of the objective lens.

12. The optical apparatus of claim 11, wherein the first and second interferometers are in the optical path.

13. The optical apparatus of claim 11, wherein the first interferometer has a second interferometer optical axis intersecting the optical axis.

14. The optical apparatus of claim 11, wherein the first interferometer has a second interferometer optical axis intersecting the optical axis.

15. The optical apparatus of claim 11, wherein a plane defined by the first interferometer optical axis and the optical axis perpendicularly intersects a plane defined by the second interferometer optical axis and the optical axis.

16. the optical apparatus of claim 11, wherein the pencil of light rays is filtered by the first interferometer to produce a definable number of constructive interference fringe rings all sharing a center point and each ring has a unique radius as measured from the center point.

17. The optical apparatus of claim 16, wherein the pencil of light rays filtered by the first interferometer and the second interferometer becomes a sector as manifested on a focal plane of the objective lens.

18. The optical apparatus of claim 11, wherein one of or both of the first and second interferometers are Fabry-Perot interferometers.

19. The optical apparatus of claim 11, wherein one of or both of the first and second interferometers are interference filters.

* * * * *